United States Patent Office.

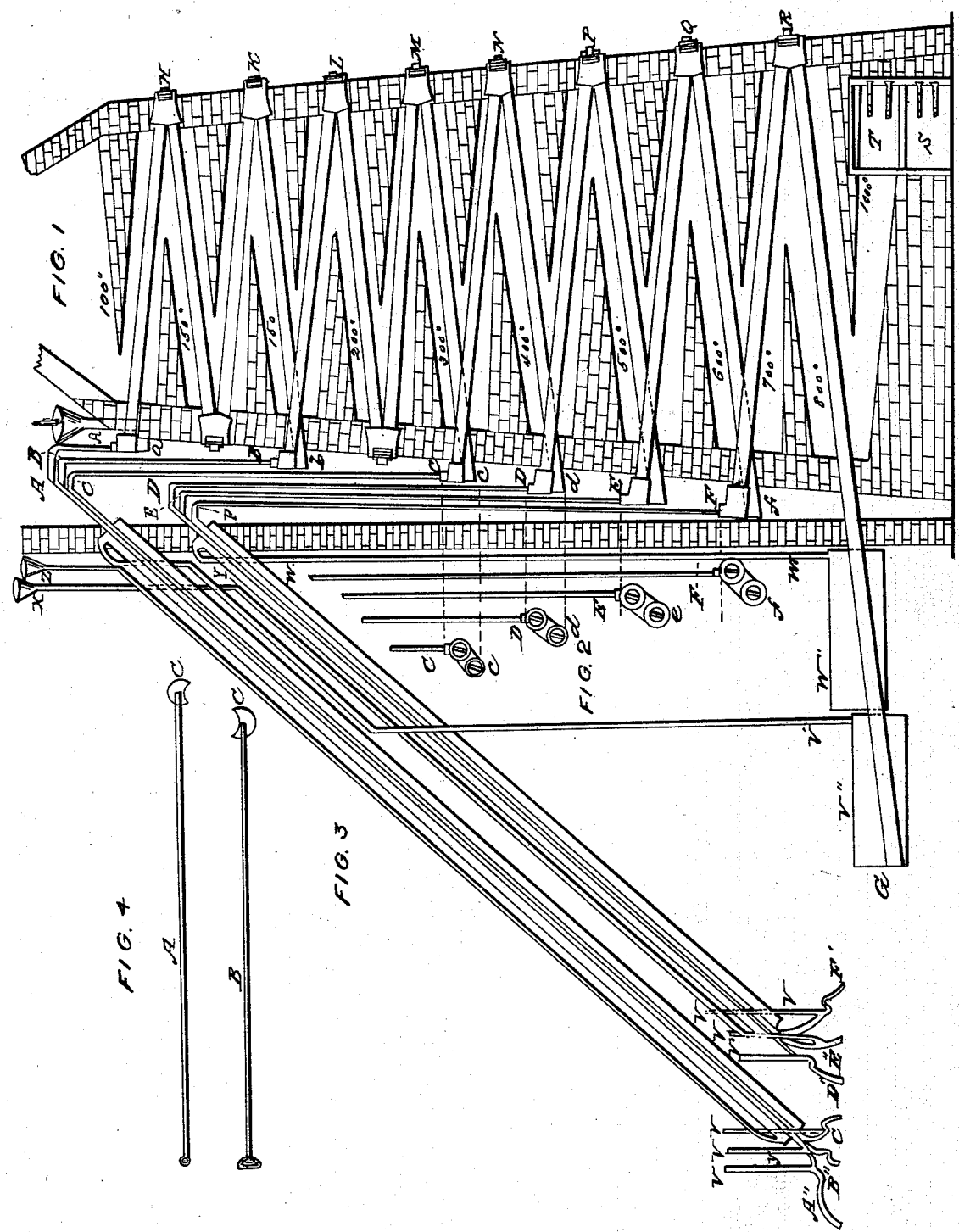

P. H. VANDER WEYDE, M. D., OF PHILADELPHIA, PENNSYLVANIA.

Letters Patent No. 62,096, dated February 12, 1867; antedated January 30, 1867.

IMPROVEMENT IN TUBULAR STILLS FOR CONTINUOUS DISTILLATION.

The Schedule referred to in these Letters Patent and making part of the same.

TO ALL WHOM IT MAY CONCERN:

Be it known that I, P. H. VANDER WEYDE, M. D., of the city and county of Philadelphia, State of Pennsylvania, have invented a new Continuous Method of Distilling Volatile Liquids, consisting in a tubular apparatus or still extended in a zigzag manner upward from the fire-place in the flue, through which tube the liquid is steadily kept flowing, evaporating in its downward course, the most volatile portion first, in the upper part of the flue, the lesser volatile portions in the middle part, and the least volatile in the lower part near the fire, where they are submitted to a sufficient heat. This tube is provided with a number of exits for the developed vapor, and traps to prevent the vapors of different densities to mix, but compels them to be condensed each in its separate channel. The motion of the liquid in its downward course makes, of course, this fractional evaporation more perfect.

To understand my present invention, it may be well to refer to two of my former patents, one a multiple still, granted March 6, 1866, No. 53,062, and the other a fractional condenser, granted September 11, 1866, No. 58,005. In the first of these patents an apparatus is described in which all the volatile products are mixed and brought in a second still, by which the most volatile products are separated from the lesser volatile, which are left behind; the vapors are condensed and brought into a third still, when they are heated again to a lesser degree, the most volatile portions again driven off, condensed, and brought in a fourth still, where the same process may be repeated. These stills, standing over the same flue at different distances from the fire, are, of course, submitted to a differently graduated temperature, and in this way liquids of different volatility were obtained by one single operation, which, however, included repeated distillations. In my second patent, which I call my fractional condenser, the repeated distillations are avoided, and the different portions of the vapors are condensed according to their different volatility in a tubular apparatus with several outlets, where the least volatile substances, being condensed first, are drawn off before they are mixed with the more volatile parts, the most volatile vapors alone going through the whole length of the condensing tubes, and are the last of all separated from the non-condensable gases, the lowest part being kept the coolest of any part of the condenser.

In both of these inventions the common still, either vertical or horizontal, is used, in which still the liquid is placed in large quantities, and all the different vapors driven off either in succession or mixed, making a later separation necessary. In my present invention I discard this conventional still altogether, and in place of it I use a very long tube, of about two inches or more diameter, inserted in a vertical flue; and following its zigzag course, as represented in the drawing. The liquid to be distilled enters through a funnel at the top, with a stream much smaller than the capacity of the tube, in order to give room for the ascent of the vapors developed. The vapors arising in the course A H K B will, of course, only ascend to A, and escape by the tube A A', and be condensed in A' A''; the liquid at B, after being deprived of its most volatile portions by the moderate heat at this point of the tube, pursuing its course from B to L M and C, and its vapors will ascend towards B, escape by the tube B B' and be condensed in B B' B''. It is clear that in this downward course, the liquid being submitted to a gradually increasing heat, it will give off vapors less and less volatile, till, at the latter part of the apparatus in F R G, the least volatile parts will be driven off by the greatest heat intended to be applied, which heat is to be regulated by the furnace T S, according to the nature of the liquid to be distilled, the remnant escaping by G. One of the great advantages of this arrangement over the common way of distillation is, that the vapors become mixed never, but that to the contrary each particular vapor (dependent on a certain temperature) is always developed in the same part of the apparatus, and is always condensed in absolutely the same separate condenser, to which vapors developed by other temperatures have no access. This is of the greatest importance in the distillation of alcoholic liquids, where the fusel oil comes off at the latter part of the operation, by a higher temperature, (about 270°,) contaminating with its odor the whole apparatus, and consequently affecting all subsequent operations. In my tubular still the fusel oil can never reach the upper part of the still, not being formed when the liquid passes there; it will therefore only contain the finest, sweetest, and purest spirits, being distilled at a low temperature. To guard against the possible stopping up of the traps $a\ b\ c\ d\ e$ by sediment in the mash, it may be settled and strained, and the liquid pressed out of the sediment. This precaution usually neglected in distilleries, is advantageous, also, in other respects. In order to secure the graduated temperature, which may be too uniform through the whole length of the flue, valves are provided at different heights of the flue, giving exit to portions of heat. Foaming or boiling over, which produces sometimes such trouble in common distilleries, is, in this arrangement, perfectly harmless; in fact it cannot possibly take place, as there is never liquid enough present to boil over. H K L M N P Q R are connecting-caps with screws, which can be taken out for the purpose of cleaning, repairing, or disconnecting the tubes, if necessary. At the other side the arrangement is similar, giving access to the interior of the tubes from both sides, only here are the escape tubes for the vapors attached, and the space occupied by them is enclosed by a second wall, in order to keep them at a proper temperature, and prevent condensation of the vapor before it reaches the proper condenser. In this wall are openings and doors corresponding with the connecting portions A B C D, etc., in order to make them accessible; and the parts $a\,b\,c\,d$ of the tubes are lower than the parts A B C D where the vapors escape, in order that in this depression the liquid may form a kind of trap preventing the vapors of different volatility from going higher than the points A B C D; they are thus kept separate, and cannot become intermingled, as is the case with all stills thus far in use. The peculiar arrangement of this trap for the vapors is indicated next to the ascending tubes in Figure 2, which represents a view of that side of the flue, to which it is connected by dotted lines. When distilling petroleum the temperatures are of course higher than for alcoholic liquids; the numbers indicating those temperatures in the drawing correspond about with the different degrees of heat to which petroleum is to be submitted in order to separate gasoline at A, naphtha at B, benzine at C, kerosene at D and E, and heavy oils at F.

Figure 4 represents a scraper to clean out the tubes when necessary. It is made of a metallic rod, with disk $c$ attached at right angles, placed in the position A; it may be passed obliquely upward in the tubes without interrupting the flow of liquid, and when turned in the position B will, when pulled downward in the tube, clear out the lower part of each of them.

In the drawing, Figure 3, are represented two Liebig's condensers, each containing three tubes, having at their lower end the gas exit tube V V attached; the cold water is admitted below by $x\,x$ and $z\,y$, and in ascending becoming hot, has its exit by V and W. It is clear that any other style of common condenser may be attached to this tubular still; it will only require as many condensing tubes as there are exits for the vapor. The water overflowing from the condenser runs down the tubes W W' Y Y', and may be used to cool the escaping remnant by means of the water tanks W'' and Y'' when distilling petroleum; in this case the temperature of the remnant being about 500°, the escaping water, nearly 212°, will at once boil, and the excess of heat of the remnant will be carried off as latent heat by the escaping steam. When distilling alcoholic liquids, however, there is no necessity of cooling the remnant, for which the water of condensation would scarcely be cold enough.

I do not claim any peculiar condenser to be attached to this apparatus; but what I claim, and wish to secure by Letters of Patent, is—

1. A still, consisting of a series of tubes situated in the flue, through which tubes the liquid to be distilled is uninterruptedly passed in a small stream, and in its downward course submitted to a continual increased heat.

2. I claim a number of vapor tubes, attached at different height to this tubular still, giving exit to vapors of different density and volatility, each exit tube condensing its own vapor separately in a common worm, Liebig's condenser, or any other kind, and thus producing liquids of different density by one single uninterrupted operation; also preventing fusel and other oils from contaminating any other part of the apparatus or of its products with their flavors.

3. The manner of connecting the tubes by means of traps for the separation of the different vapors, and by screw caps, giving access to their interior for cleaning, repair, or other purposes.

In testimony whereof I have signed my name to this specification in the presence of two subscribing witnesses.

P. H. VANDER WEYDE.

Witnesses:
A. L. FLEURY,
LOUIS DE RONCERAY.